United States Patent [19]

Johne et al.

[11] 4,251,121
[45] Feb. 17, 1981

[54] FRICTION BEARING FOR CYLINDERS IN A PRINTING PRESS

[75] Inventors: Hans Johne, Radebeul; Arndt Jentzsch, Coswig, both of German Democratic Rep.

[73] Assignee: Veb Polygraph Leipzig Kombinat für Polygraphische Maschinen und Ausrüstungen, Leipzig, German Democratic Rep.

[21] Appl. No.: 70,841

[22] Filed: Aug. 29, 1979

[51] Int. Cl.³ .................. F16C 17/02; F16C 25/02
[52] U.S. Cl. ........................... 308/37; 308/63; 308/240
[58] Field of Search ............ 308/20, 37, 63, 66, 308/69, 236, 237 R, 238, 240

[56] References Cited

U.S. PATENT DOCUMENTS

| | | | |
|---|---|---|---|
| 1,477,622 | 12/1923 | Aab | 308/66 |
| 3,169,040 | 2/1965 | Ryon | 308/236 |
| 3,317,255 | 5/1967 | Wehlau | 308/37 |
| 3,400,937 | 9/1968 | Crankshaw | 308/238 |
| 3,449,032 | 6/1969 | Scheufler | 308/237 R |
| 4,199,859 | 4/1980 | Swavely | 308/238 |

FOREIGN PATENT DOCUMENTS

| | | | |
|---|---|---|---|
| 502845 | 7/1930 | Fed. Rep. of Germany | 308/63 |
| 712185 | 10/1941 | Fed. Rep. of Germany | 308/63 |

*Primary Examiner*—Richard R. Stearns
*Attorney, Agent, or Firm*—Michael J. Striker

[57] ABSTRACT

The friction bearing for supporting a journal of a cylinder of a printing press includes a bearing sleeve supported in a tubular bearing block and being manufactured with conventional machining tolerances. To minimize the radial play of the bearing, at least three axially directed cylindrical bores are provided in the annular face of the bearing sleeve and extend in the axial direction. Tapering pins are driven into respective bores to expand on discrete locations the bearing surface of the sleeve, thus minimizing the gap between the supporting bearing surfaces and the periphery of the journal. The remaining gap is larger in size than the adjusted gap and serves for conducting oil into the bearing.

4 Claims, 3 Drawing Figures

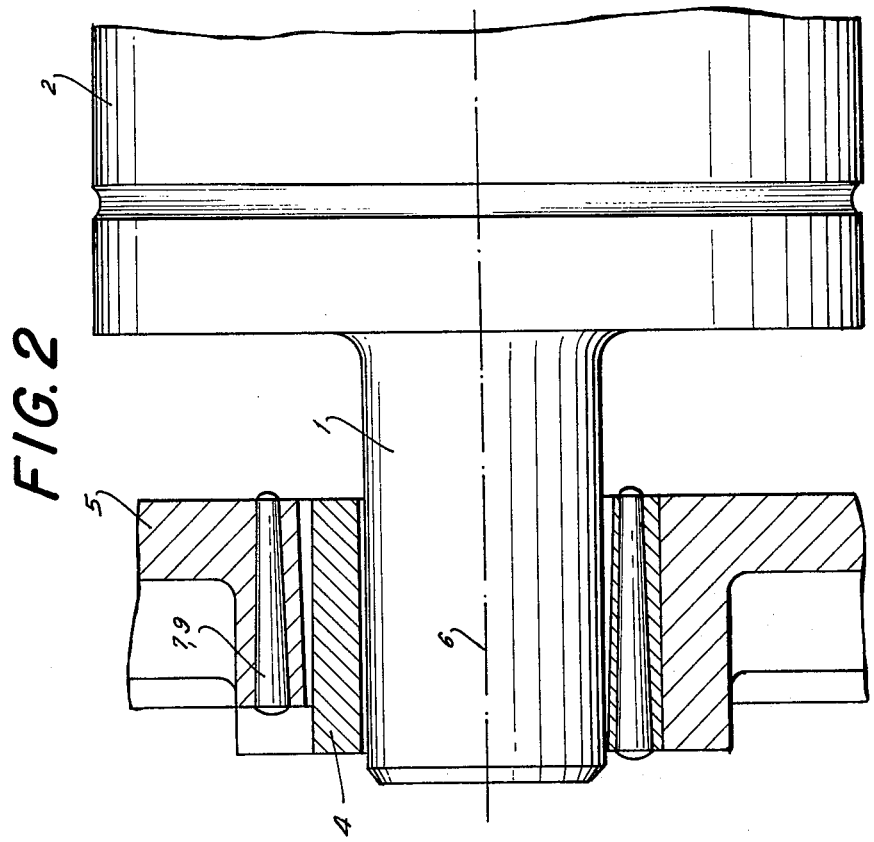
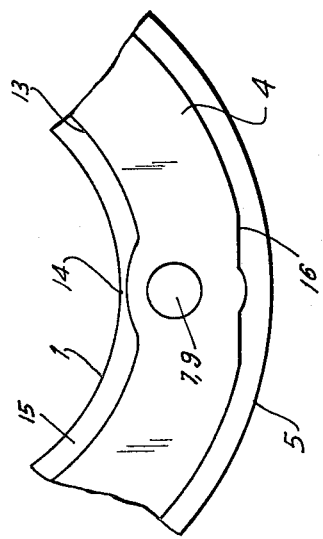

FRICTION BEARING FOR CYLINDERS IN A PRINTING PRESS

BACKGROUND OF THE INVENTION

This invention relates generally to friction bearings, and more particularly it relates to a friction bearing for a journal or a roller in a printing press, requiring very narrow tolerances between the bearing surfaces.

This requirement, necessitated by the printing technology, has hitherto been attained only by a costly process of selective pairing of compatible bearings. Upon the wear of any of the friction bearings, the new bearings must be individually adjusted, which fact contributes to further expenses.

From the German publication "Konstruktion im Maschinen-Apparate- und Gerätebau", 14 (1962), 5, page 170, edited by Springer Verlag Berlin/Göttingen/Heidelberg 1962, a friction bearing having a plurality of sliding surfaces in different modifications is known. In these known embodiments, the sliding surfaces of the bearing sleeve or of the journal are made in an eccentric form with a corresponding number of oil grooves in the sliding surfaces. The disadvantages of such friction bearings having a plurality of sliding surfaces is their costly manufacture.

SUMMARY OF THE INVENTION

It is, therefore, a general object of the present invention to overcome the aforementioned disadvantages.

More particularly, it is an object of the invention to provide an improved friction bearing for journals of printing cylinders, the manufacturing costs of which are substantially reduced.

An additional object of the invention is to provide such an improved friction bearing which has a high load capacity and a long working life.

A further object of the invention is to provide such an improved friction bearing which has optimum vibration damping quality.

Still another object of this invention is to provide such an improved friction bearing in which the costly selective pairing known from the prior art can be dispensed with.

In keeping with these objects and others which will become apparent hereafter, one feature of the invention resides, in a friction bearing for a journal of a cylinder or a roller in a printing press, in a combination which comprises a plurality of axially directed bores passing through the bearing sleeve and/or the surrounding tubular bearing block, and a plurality of tapering pins driven into these bores to expand discrete portions of the bearing surface of the sleeve in order to adjust radial play in the bearing. The tapering pins can also be introduced into the axial bores in the tubular bearing block. The tapering ends of the pins are directed toward the cylinder so that the expanded bearing surface portions are located near the outer face of the bore. In order to compensate the deformation on the outer periphery of the bearing sleeve, the latter is formed with a recessed flat area in the range of the bore.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional side view of the bearing of FIG. 1; and

FIG. 3 is a front view of a cut-away portion of FIG. 1 shown on an enlarged scale.

DESCRIPTION OF THE PREFERRED EMBODIMENTS

Figure 1:
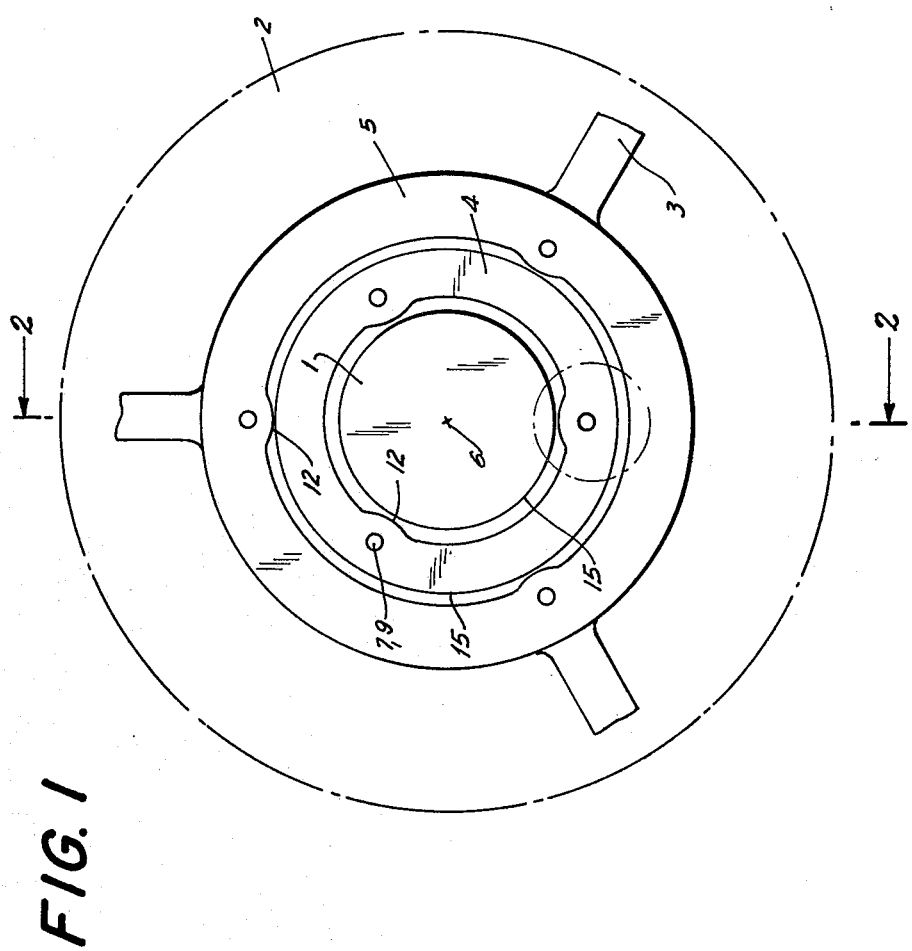
FIG. 1 is a front view of the friction bearing of this invention.

Referring firstly to FIGS. 1 and 2, there is shown a bearing pin or a journal 1 of a printing cylinder 2. The journal 1 is supported for rotation in a friction bearing 3 including a tubular bearing block 5 and a bearing sleeve 4 disposed in the bearing block for slidably supporting the journal 1. All the aforementioned component parts of the bearing 3 are manufactured with standard machining tolerances.

To adjust radial play of the journal 1 in the bearing 3 there are provided, according to this invention, cylindrical bores 7 in the face of the bearing sleeve 4 and in the face of the tubular bearing block 5 which extend parallel to the axis 6 of the journal 1. In this example, both the bearing sleeve 4 and the bearing block 5 have, respectively, three uniformly distributed cylindrical bores 7. During the installation of the cylinder 2, tapering pins 9 are driven into the axial bores 7 and locally deform the juxtaposed portions of the bearing surface of the sleeve 4 and the inner peripheral portions of the tubular bearing block 5. The inwardly projecting deformations 12 on the cylindrical bearing surface 13 of the sleeve 4 and on the inner wall of the tubular bearing block 5 extend in the direction of the axis 6 and taper toward the cylinder 2. In this manner the play between the bearing surface 13 and the journal 1 is adjusted to be minimum at three discrete points corresponding to the narrowest gap 14, whereas the remaining gap 15 is larger in size and corresponds to the usual, non-adjusted tolerances. Inasmuch as the tapering pins 9 deform the material of the bearing sleeve 4 and of the bearing block 5 both inwardly and outwardly, tending to cause a bulging of the outer cylindrical surface of the sleeve 4 which is not desirable, compensation is made for this outer bulging by providing the outer surface of the sleeve 4 with recessed or flat portions 16 so that, when the bulging deformation occurs, it does not exceed the range of the outer circumference of the sleeve.

The present invention results in a simple form of a multi-surface friction bearing which has optimum configuration for preventing the generation of vibrations. The controlled deformation of the bearing surface 13 by means of tapering pins 9 in the deformable material of the bearing, makes it possible for the radial play in the most narrow gap 14 to be kept to a minimum, whereas a relatively large amount of oil can flow through the remaining larger gap 15 between the journal and the bearing surface. An additional advantage of the bearing of this invention resides in the fact that due to the tapering shape of the deformations 12 in the axial direction, the clearance of the bearing surfaces also tapers axially and has a minimum value at locations where the swing of the journal has its maximum value. Furthermore, the solution according to this invention is applicable also for adjusting the radial play when the bearing becomes warm and thus contributes to the prolongation of the working life of the friction bearing.

It will be understood that each of the elements described above, or two or more together, may also find a useful application in other types of constructions differing from the types described above.

While the invention has been illustrated and described as embodied in a friction bearing for use with a printing cylinder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A friction bearing for a journal of a cylinder in a printing press, comprising a bearing block; a bearing sleeve disposed in said block for slidably supporting said journal; a plurality of axially directed cylindrical bores passing through said sleeve; and a plurality of tapering pins driven into said bores to expand discrete portions of the bearing surface of said sleeve.

2. A friction bearing as defined in claim 1, wherein said bearing block has a tubular configuration; and further including a plurality of axially directed bores and a plurality of tapering pins driven into said bores to expand discrete portions of the inner surface of said tubular block.

3. A friction bearing as defined in claim 2, wherein said tapering pins in said cylindrical bores taper in direction towards the journalled cylinder.

4. A friction bearing as defined in claim 1, wherein the outer periphery of said bearing sleeve is provided with recessed portions in the range of said bores to compensate for deformation caused by said tapering pins.

* * * * *